US010693585B2

(12) United States Patent
Stirling-Gallacher et al.

(10) Patent No.: US 10,693,585 B2
(45) Date of Patent: *Jun. 23, 2020

(54) SYSTEM AND METHOD FOR MULTI-USER FULL DUPLEX LINK ADAPTATION

(71) Applicant: Futurewei Technologies, Inc., Plano, TX (US)

(72) Inventors: Richard Stirling-Gallacher, San Diego, CA (US); Bin Liu, San Diego, CA (US); Lili Zhang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,118

(22) Filed: Dec. 19, 2018

(65) Prior Publication Data

US 2019/0123855 A1 Apr. 25, 2019

Related U.S. Application Data

(63) Continuation of application No. 15/980,499, filed on May 15, 2018, now Pat. No. 10,218,458, which is a
(Continued)

(51) Int. Cl.
*H04L 1/00* (2006.01)
*H04L 5/00* (2006.01)
(Continued)

(52) U.S. Cl.
CPC ......... *H04L 1/0017* (2013.01); *H04B 7/2656* (2013.01); *H04L 1/0003* (2013.01);
(Continued)

(58) Field of Classification Search
CPC ... H04L 1/0017; H04L 1/0009; H04L 5/0057; H04L 5/14; H04L 1/0026; H04L 1/0003; H04W 52/241; H04B 7/2656
See application file for complete search history.

(56) References Cited

U.S. PATENT DOCUMENTS

| 2010/0309793 A1 | 12/2010 | Choi et al. | |
| 2013/0223294 A1* | 8/2013 | Karjalainen | H04L 5/14 370/277 |

(Continued)

FOREIGN PATENT DOCUMENTS

| CN | 101631355 A | 1/2010 |
| CN | 102111885 A | 6/2011 |

(Continued)

OTHER PUBLICATIONS

Catt, "Half duplex UE operation for FDD-TDD CA," 3GPP TSG RAN WG1 Meeting #76, R1-140105, Prague, Czech Repulic, Feb. 10-14, 2014, 4 pages.

(Continued)

*Primary Examiner* — Hashim S Bhatti
(74) *Attorney, Agent, or Firm* — Slater Matsil, LLP (57) ABSTRACT

A method of link adaptation is described including establishing, using a first serving point, a multi-user full duplex mode wherein the multi-user full duplex mode enables a downlink to a first wireless device and an uplink from a second wireless device. The first serving point requests from the first wireless device a first channel quality indicator indicating channel quality between the serving point and the first wireless device in a full duplex time period and a second channel quality indicator indicating channel quality between the serving point and the first wireless device in non-full duplex time period. The full duplex mode is evaluated using the first and second channel quality indicators. At least one parameter of the full duplex mode is adjusted based on the evaluating.

20 Claims, 10 Drawing Sheets

Related U.S. Application Data continuation of application No. 15/060,481, filed on Mar. 3, 2016, now Pat. No. 10,009,143.

(51) Int. Cl.
  *H04L 5/14* (2006.01)
  *H04W 52/24* (2009.01)
  *H04W 52/26* (2009.01)
  *H04B 7/26* (2006.01)

(52) U.S. Cl.
  CPC .......... *H04L 1/0009* (2013.01); *H04L 1/0015* (2013.01); *H04L 1/0026* (2013.01); *H04L 1/0035* (2013.01); *H04L 5/006* (2013.01); *H04L 5/0057* (2013.01); *H04L 5/14* (2013.01); *H04L 5/143* (2013.01); *H04W 52/24* (2013.01); *H04W 52/241* (2013.01); *H04W 52/262* (2013.01); *H04L 5/1461* (2013.01); *H04L 2001/0092* (2013.01); *H04W 52/242* (2013.01); *H04W 52/243* (2013.01)

(56) References Cited

U.S. PATENT DOCUMENTS

| | | |
|---|---|---|
| 2014/0078939 A1 | 3/2014 | Shirani-Mehr et al. |
| 2014/0369281 A1* | 12/2014 | Zhu ................... H04W 72/1226 370/329 |
| 2015/0078177 A1* | 3/2015 | Buckley .............. H04W 72/082 370/252 |
| 2015/0382375 A1* | 12/2015 | Bhushan ............... H04L 5/0005 370/252 |
| 2016/0183105 A1 | 6/2016 | Jiang et al. |
| 2017/0041118 A1 | 2/2017 | Liu et al. |
| 2017/0054544 A1* | 2/2017 | Kazmi .................. H04L 5/0044 |
| 2017/0163403 A1* | 6/2017 | Karjalainen .............. H04L 5/14 |
| 2017/0302337 A1* | 10/2017 | Liu ........................ H04B 7/005 |

FOREIGN PATENT DOCUMENTS

| | | |
|---|---|---|
| CN | 103703715 A | 4/2014 |
| CN | 103797880 A | 5/2014 |
| CN | 103974434 A | 8/2014 |
| CN | 104105208 A | 10/2014 |
| CN | 104956734 A | 9/2015 |
| EP | 2930994 A1 | 10/2015 |
| JP | 2010050456 A | 2/2010 |
| WO | 2014046761 A1 | 3/2014 |
| WO | 2015077987 A1 | 6/2015 |

OTHER PUBLICATIONS

Zhang, et al., "Investigation on DL and UL Power Control in Full-Duplex Systems," IEEE ICC 2015 conference, 5 pages.

* cited by examiner

SYSTEM AND METHOD FOR MULTI-USER FULL DUPLEX LINK ADAPTATION

CROSS-REFERENCE TO RELATED APPLICATIONS

This application is a continuation of U.S. patent application Ser. No. 15/980,499, filed on May 15, 2018, which is a continuation of U.S. patent application Ser. No. 15/060,481, filed on Mar. 3, 2016 (now U.S. Pat. No. 10,009,143 issued Jun. 26, 2018), all of which applications are hereby incorporated herein by reference in their entireties.

TECHNICAL FIELD

The present disclosure relates generally to digital communications and more particularly to a system and method for full duplex link adaptation in a multi-user full duplex communications system.

BACKGROUND

In a full duplex (FD) device, the device simultaneously transmits and receives in a single frequency band. In other words, uplink and downlink transmissions occur at the same time and in the same frequency band. Since FD devices do not have to wait until they are done transmitting in order to receive as half duplex devices do, there is a potential to double spectrum efficiency. However, because FD transmissions involve simultaneous transmission and reception, the transmitted signal interferes with the received signal and the FD receiver needs to perform cancellation of the transmitted signal. Unless the different links are carefully controlled, the transmitted signal may excessively interfere with the received signal. This problem is even more complex in situations involving more than two devices (i.e. multi-user) because there are multiple transmissions that may cause interference. Examples of such situations are when a base station relays a transmission from one base station to a user device or when multiple user devices are transmitting and receiving to and from a full duplex capable base station at the same time and on the same frequency. For example, this situation can arise when at least one serving entity (base station, enhanced NodeB, access point, etc.) is performing a full duplex operation where the uplink comes from one device and the downlink is directed to another device.

SUMMARY

A first described embodiment of the present invention is a method of link adaptation including establishing, using a first serving point, a multi-user full duplex mode wherein the multi-user full duplex mode enables an uplink from a first wireless device and a downlink to a second wireless device and requesting by the first serving point from the second wireless device a first channel quality indicator indicating channel quality between the serving point and the second wireless device in a full duplex time period and a second channel quality indicator indicating channel quality between the serving point and the second wireless device in non-full duplex time period. The full duplex mode is evaluated using the first and second channel quality indicators and at least one parameter of the full duplex mode is adjusted based on the evaluation.

Another described embodiment is a method of link adaptation including establishing, using a first serving point, a full duplex mode between a first wireless device and a second wireless device, wherein the full duplex mode includes an uplink from the first wireless device to the first serving point and wherein the uplink from the first wireless device to the first serving point has a first modulation and coding scheme (MCS) level and includes a downlink from the first serving point to the second wireless device having a second MCS level. A first channel quality indicator is requested by the first serving point from the second wireless device (receiving downlink) indicating channel quality between the first serving point and the second wireless device in a full duplex time period and a second channel quality indicator indicating channel quality between the first serving point and the second wireless device in a half-duplex time period. The full duplex mode is evaluated using the first and second channel quality indicators and one or both of the first and second MCSs are altered based on the evaluating.

Another described embodiment is method for link adaptation including establishing, using a first serving point base station, a full duplex mode between a first user device and a second user device, wherein the full duplex mode includes an uplink from the first wireless device to the first serving point and a downlink from the first serving point to the second wireless device. A measured signal interference noise ratio (SINR) is compared at the first serving point to a stored SINR to determine if the measured SINR is an increase, decrease or the same as the stored SINR. A first channel quality index (CQI) is requested indicating channel quality between the first serving point and the second wireless device in a full duplex time period and a second CQI is requested indicating channel quality between the first serving point and the second wireless device in a non-full duplex time period. If the measured SINR is an increase over the stored SINR and if the difference between the first CQI and second CQI is greater than a first threshold, a transmission power of the first user device is reduced. If the measured SINR is an increase over the stored SINR and if the difference between the first CQI and second CQI is lower than the first threshold, the level of modulation and coding scheme (MCS) is increased or the transmission power of the first user device is reduced if the highest MCS is already being used. If the measured SINR is the same as the stored SINR, the serving point waits until a subsequent SINR measurement has been made. If the measured SINR is a decrease from the stored SINR and if the difference between the first CQI and second CQI is greater than the first threshold, the transmission power of the first user device is reduced and the level of the MCS for the first user device is reduced. If the measured SINR is a decrease from the stored SINR and if the difference between the first CQI and second CQI is lower than the first threshold but greater than a second threshold, the MCS level of the first device is reduced. If the measured SINR is a decrease from the stored SINR and if the difference between the first CQI and second CQI is lower than the second threshold, the transmission power of the first user device is increased or if the first user device is already transmitting at maximum power the level of the MCS for the first device is modified.

Another described embodiment is a network including a first wireless device, a second wireless device and a first serving point. The first serving point is configured to establish a full duplex mode between the first wireless device and the second wireless device, wherein the full duplex mode includes an uplink from the first wireless device to the first serving point and a downlink from the first serving point to the second wireless device. The first serving point is configured to request from the second wireless device a first channel quality indicator (CQI) indicating channel quality between the first serving point and the second wireless device in a full duplex time period and a second channel quality indicator indicating channel quality between the first serving point and the second wireless device in a non-full duplex time period. The first serving point provides a signal to the first wireless device to adjust at least one parameter of the full duplex mode based on an evaluation of the full duplex mode using the first and second CQI.

Another described embodiment is a first serving point including a processing device and a non-transitory medium storing a program. The program causes the processing device to perform the steps of establishing, using the first serving point, a full duplex mode between a first wireless device and a second wireless device, wherein the full duplex mode includes an uplink from the first wireless device to the first serving point and a downlink from the first serving point to the second wireless device. A first channel quality indicator (CQI) is requested by the first serving point from the second wireless device indicating channel quality between the first serving point and the second wireless device in a full duplex time period and a second channel quality indicator is requested indicating channel quality between the first serving point and the second wireless device in a non-full duplex time period. The full duplex mode is evaluated using the first and second channel quality indicators and at least one parameter of the full duplex mode is adjusted based on the evaluation.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operation of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the embodiments disclosed herein, and do not limit the scope of the disclosure.

Figure 1:
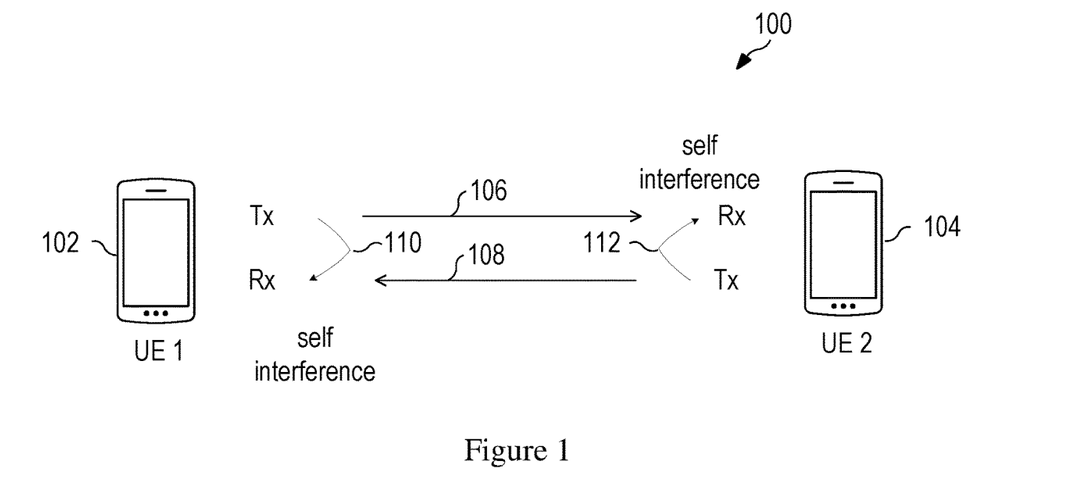
FIG. 1 illustrates full duplex communication between two user devices.

FIG. 1 illustrates full duplex communication between two user devices. In link 100, user equipment 1 (UE1) 102 transmits on uplink (UL) 106 to UE2 104. UE1 102 receives transmissions from UE2 104 on downlink (DL) 108. From the perspective of UE2, transmission 108 is the DL and transmission 106 is the UL. By their nature, wireless transmissions cannot be completely contained such that all of their energy only arrives at the desired destination. Because both devices are transmitting and receiving at the same time, a portion of the transmission energy from UE1 102 will be received by the reception antenna(s) of UE1 102. This is illustrated as self-interference 110 in FIG. 1. Similarly, a portion of the transmission energy from UE2 104 will be received by the reception antenna(s) of UE2 104. This is illustrated as self-interference 112 in FIG. 1.

Figure 2:
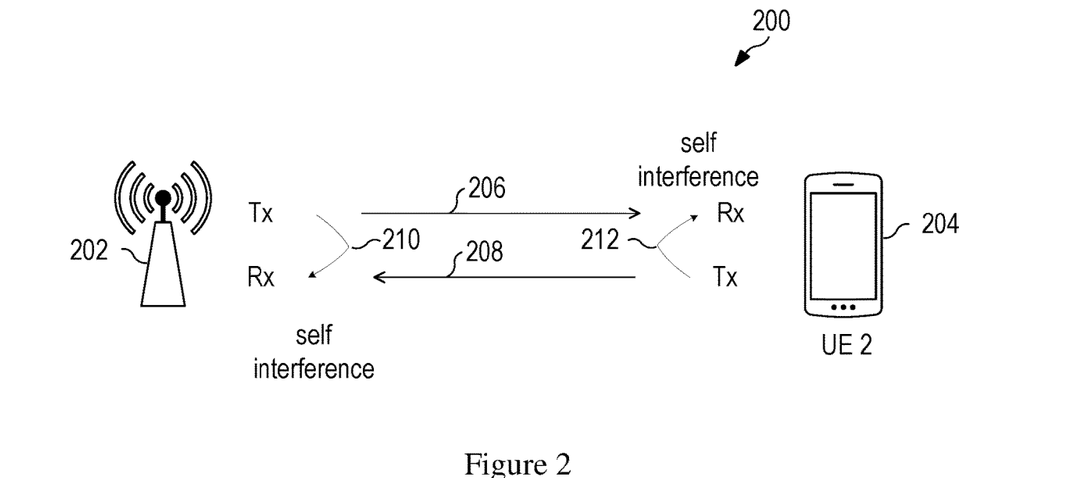
FIG. 2 illustrates full duplex communication between a user device and a base station (BS)

FIG. 2 illustrates full duplex communication between a serving point and a user equipment. A serving point can be a transmission point, eNB, base station, access point, remote radio head or any other such point which can serve more than one communication entity. In this configuration, transmission 206 provides a DL from BS 202 to UE2 204 and transmission 208 provides a UL from UE2 204 to BS 202. UE2 204 can cause self-interference 212 and BS 202 can cause self-interference 210.

Figure 3:
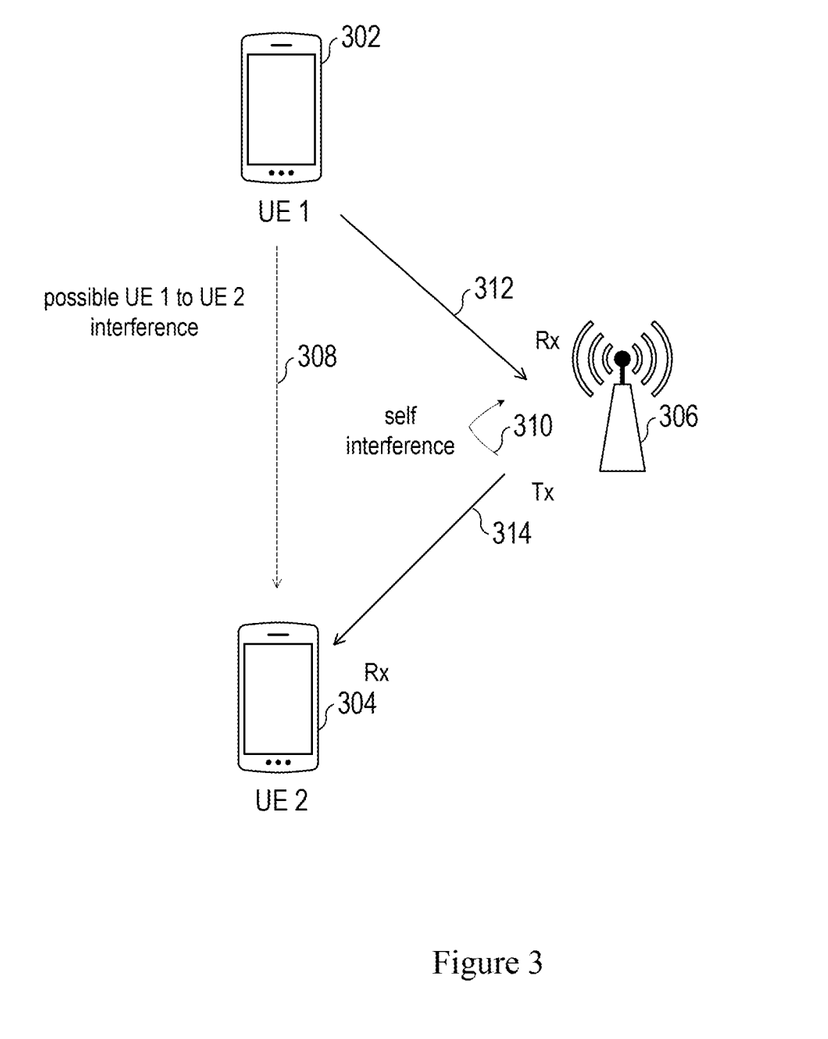
FIG. 3 is an illustration showing a serving point operating in a multi-user full duplex mode.

FIG. 3 is an illustration showing a serving point operating in a multi-user full duplex mode. Serving point 306 has established a UL transmission 312 with UE1 302. In addition serving point 306 has established a DL transmission 314 with UE2 304 at the same time and the same frequency. Thus, serving point 306 is operating in full duplex mode with regard to these transmissions. Serving point 306 may be an eNB, access point or other type of base station depending on the transmission technology utilized. In this configuration, there is more than one source of interference as compared to the configurations described in FIGS. 1 and 2. DL transmission 314 causes self-interference 310 with the UL transmission 312. In addition, the UL transmission 312 from UE1 302 to serving point 306 causes interference 308 with the reception of DL transmission 314 at UE2 304. In this scenario, any increase in transmission power from UE1 302 may cause an increase of received interference 308 at UE2 304. If the additional interference causes a reduction of the signal interference noise ratio (SINR) of DL 314, UE2 304 may request a power increase. Depending upon the new power setting of DL 314, this may cause a request to increase power of UL 312 to compensate for the increased self-interference 310 (from the new power setting of DL 314), which in turn increases interference 308 and so on, thus causing a runaway effect. This problem points to the need to take into account all coupling effects when performing power control for multi-user full duplex connections.

Figure 4A:
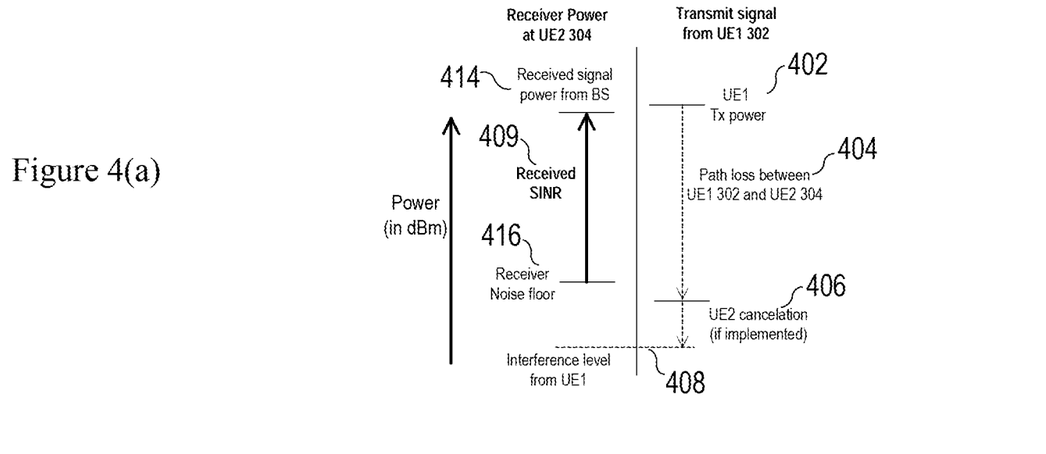
FIGS. 4(a) through 4(c) illustrate the effect of interference on the DL from the UL in a multi-user full duplex mode for different levels of transmission power and attenuation.

FIGS. 4(a) through 4(c) illustrate the effect of interference on the DL from the UL in a multi-user full duplex mode for different levels of transmission power and path loss attenuation between the multiple users. As shown on the right side of FIG. 4(a), the interference power 408 of interference 308 (FIG. 3) is the Tx power 402 of UL 312 minus the path loss from UE1 to UE2 404 and any cancellation measures 406 at UE2 to attenuate the effects of interference 308 (i.e., IC receiver, beam forming, etc.). The received SINR 409 at UE2 304 is thus the received power 414 from DL 314 minus the higher of the receiver noise floor 416 or interference power 408. In FIG. 4(a), the receiver noise floor 416 is greater than the interference level from UE1 408. Therefore, the received SINR 409 is the received signal power 414 minus the receiver noise floor 416. In this circumstance, the interference 308 will have little or no impact on DL 314.

Figure 4B:
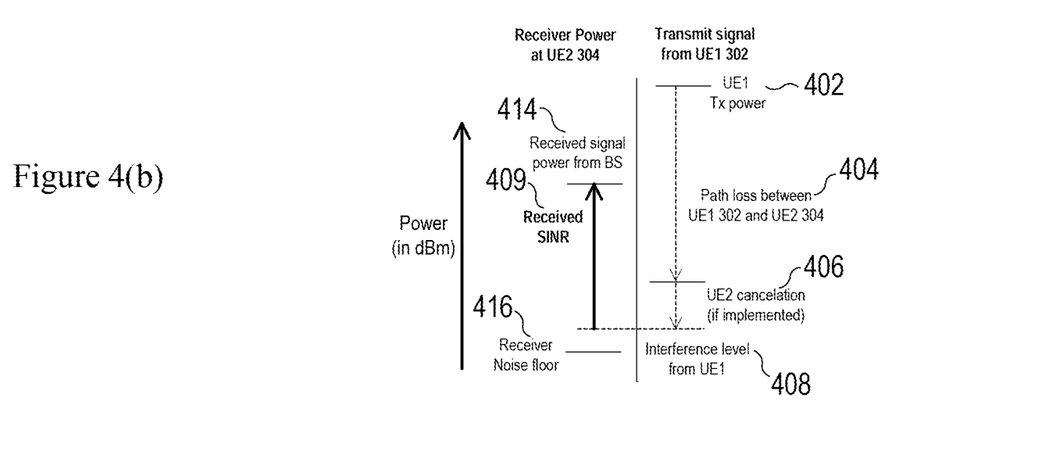
Figure 4C:
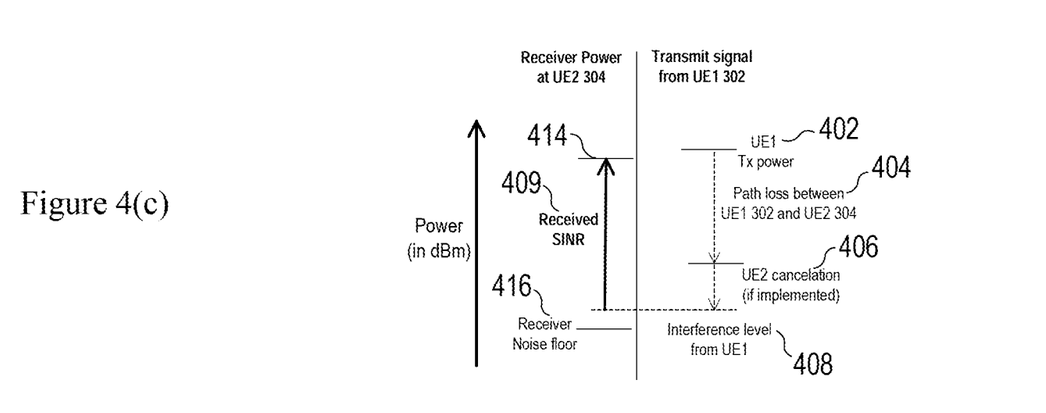

In FIG. 4(*b*), the UE1 Tx power 402 has increased to the point where the interference level from UE1 408 is greater than the receiver noise floor 416. Therefore, the received SINR 409 is the received signal power 414 minus the interference level from UE1 408. In this scenario, interference 308 has impacted the received SINR for DL 314, and thus has impacted the quality of DL 314. In FIG. 4(*c*), the UE1 transmit power 402 is the same level as that of FIG. 4(*a*). However, the path loss attenuation between UE 1 and UE 2 404 is diminished. Thus, just as in FIG. 4(*b*), interference level 408 is higher than the receiver noise floor 416, and thus the received SINR 409 is reduced, just as in the scenario of FIG. 4(*b*). A lower SINR 409 means potentially diminished performance of DL 314. Therefore, it is important to adapt UL 312 and DL 314 to minimize the impact of interference 308 on DL 314.

FIGS. 5(*a*) through (*d*) illustrate an embodiment process for link adaptation in the scenario of FIG. 3. The described process is designed to avoid the runaway effect described above and to minimize interference issues. The process includes a procedure to account for all interferences, not just self-interference. The process of FIGS. 5(*a*) through (*d*) takes into consideration all coupling effects when performing power control. For example, as described in FIGS. 4(*a*) through 4(*c*), the received SINR at UE2 may decrease due to:

1) The channel from BS to UE2 transmission has more attenuation.
2) UE1 to BS UL transmission causes interference 308, and the channel between UE 1 and UE 2 reduces attenuation to an extent that effective noise floor of UE2 416 is determined by the interference level caused by UL transmission 312.
3) UE1 transmission power increases to an extent where the effective noise floor of UE 2 receiver is determined by interference 308.

To take into account the possible interference effects on the SINR of DL 314, UE2 may provide the following feedback:

i) CQI_FD (full duplex) (CQI is measured during a time period when both UL transmission 312 and DL transmission 314 are both transmitting on the same frequency)
ii) CQI_Normal (or non-full-duplex, CQI is measured during a time period when only DL transmission 314 is active and UL transmission 312 is not transmitting at the same time and frequency)

CQI is the channel quality index. This a specific channel quality measurement procedure defined by the 3GPP (see, for example, 3GPP TS 36.213 version 8.8.0 Release 8, Section 7.2). Similar channel quality indicators are be available with other wireless standards, and their use is within the scope of the claimed invention. The CQI provides an index that is related to the SNR of the channel. Since serving point 306 knows Tx power 402 of UE1 302, the serving point 306 can distinguish cases 2) and 3) above in the discussion of FIGS. 5(*a*)-5(*d*). Along with this, as shown below, using the difference between CQI_FD and CQI_NORMAL allows for a more complete analysis of the full duplex transmission. To perform the link adaptation for UE1 and UE2 as shown in the process of FIGS. 5(*a*) through (*d*), the serving point 306 periodically monitors the SINR at the serving point 306 (from UE1 302) and the CQI reports (full duplex & non-full duplex sub-frames) from UE2 304. The CQI reports from UE2 can be transmitted to the serving point using, for example, the physical uplink shared channel (PUSCH) or the physical uplink control channel (PUCCH).

Different strategies may be used to perform link adaptation:
a) Maximize overall sum throughput: This requires a complicated optimization which may lead to unfairness (weaker links may become weaker).
b) Conservative approach: strive to minimize coupling of links, provide fairness for different link directions and enable each link direction to be adapted separately by using a practical scheme.

The process of FIGS. 5(*a*) through (*d*) is directed to approach b)—a practical solution. In step 502, the base station initially schedules the UEs for full duplex communication. In step 504, the BS (serving point 306) sets the UE1 302 uplink power and the modulation and coding scheme (MCS). Higher level combinations of modulation and coding schemes support high data rates, but require very clean signals (higher value of SINR). Lower level combinations of modulation and coding schemes support lower date rates, but work well with weak or noisy signals (lower value of SINR). In this disclosure, raising the MCS level means selecting a combination suitable for cleaner signals. Lowering the MCS level means selecting a combination suitable for noisier signals.

Figure 5A:
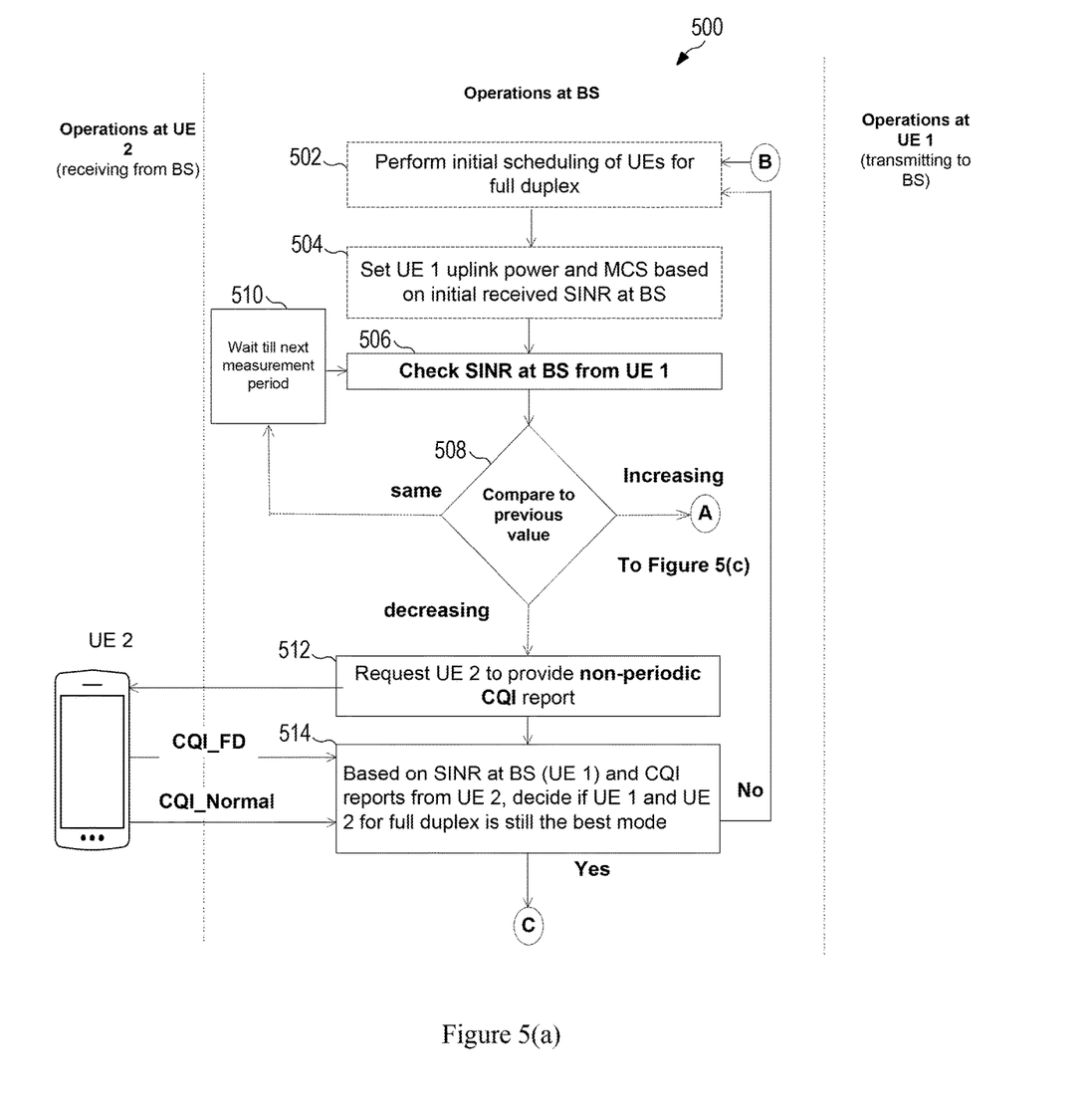
FIGS. 5(a) through 5(d) illustrate an embodiment process for link adaptation in the scenario of FIG. 4.
Figure 5B:
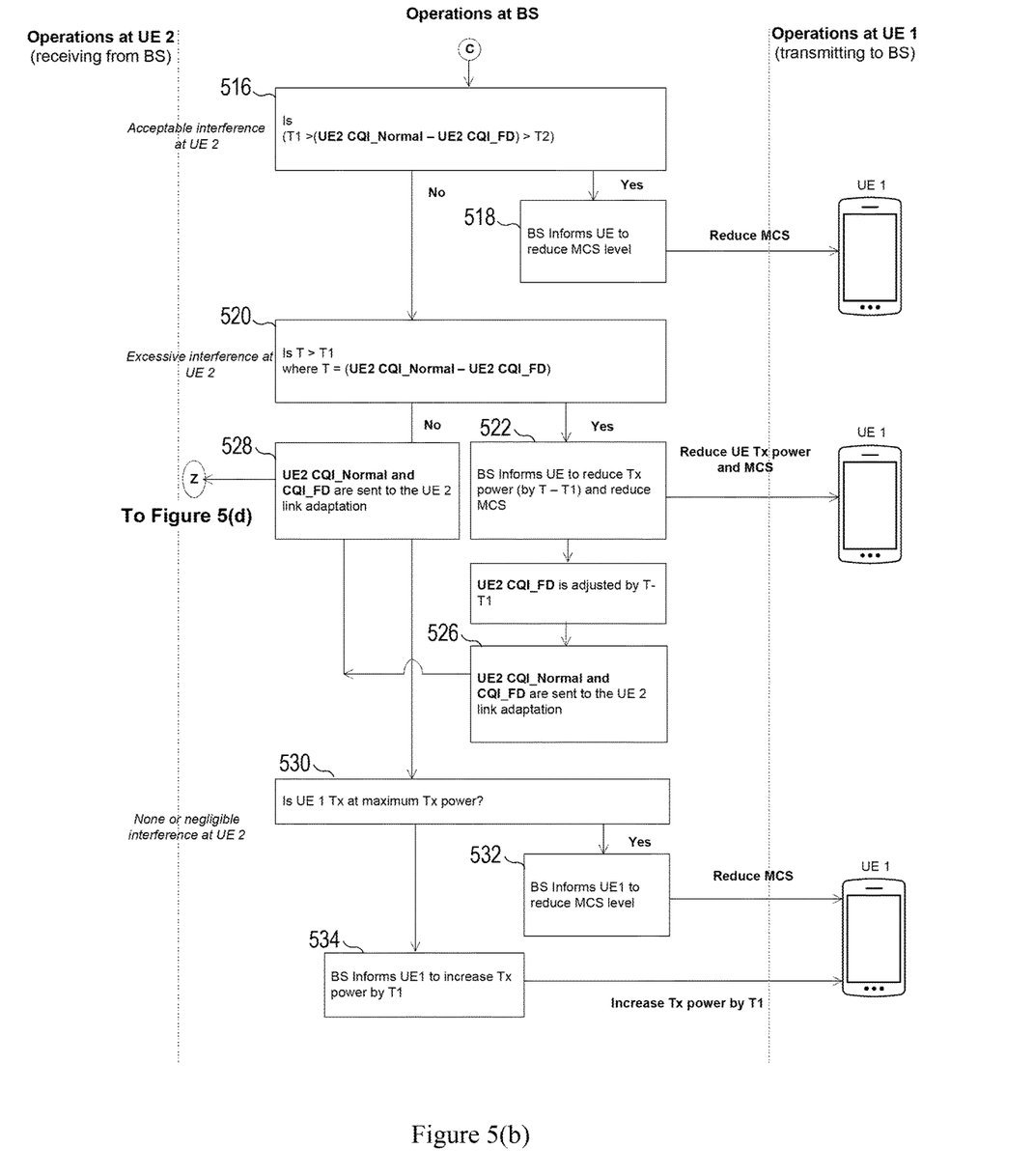
Figure 5C:
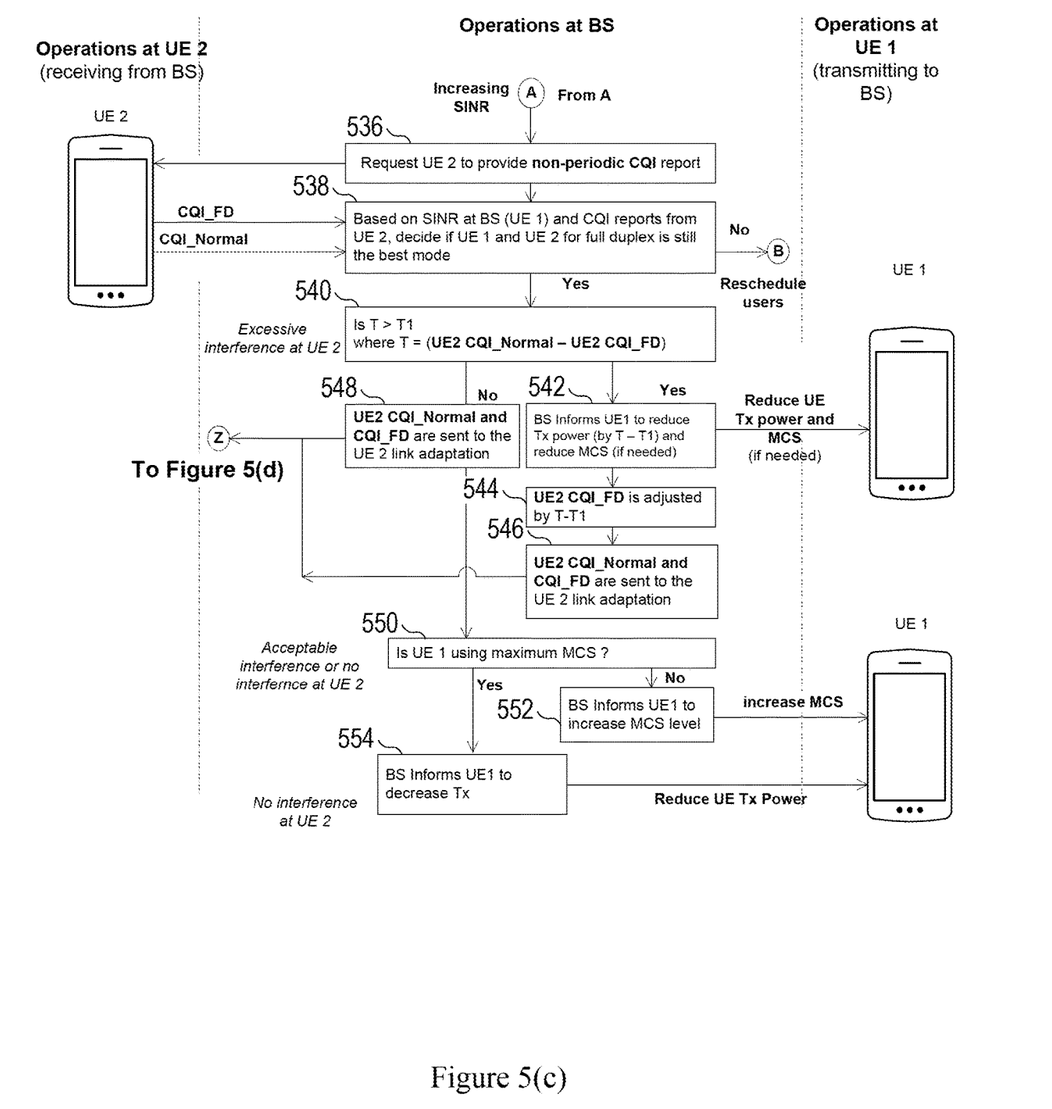

In step 506, the BS checks the SINR (or SNR) at the BS from UE1. In step 508, the measured SINR is compared to the previously measured and stored SINR. If the SINR is the same, the process goes to step 510 to wait for the next measurement period. If the SINR is increasing, the process goes to process A, which begins in FIG. 5(*c*), which is discussed below.

If the SINR is decreasing, the process goes to step 512, where the BS sends a request to UE2 to provide a non-periodic CQI report. UE2 then responds with providing CQI_FD and CQI_Normal reports. In step 514, the BS makes a determination based on the CQI_FD and CQI_Normal reports whether it is appropriate to have a full duplex connection from the serving point to UE1 302 (UL 312) and to UE2 304 (DL 314). If not, the process goes back to step 502 (FIG. 5(*a*)) and a reassignment of channels may be made by the base station.

In step 516 (FIG. 5(*b*)), it is determined if T1>T>T2 where T=(UE2 CQI_Normal−UE2 CQI_FD) (Step 516) and T1 and T2 are thresholds for comparison. T is the difference between the channel quality of DL 314 under normal, non-full duplex operation (e.g. half duplex) and the channel quality of DL 314 under full duplex operation. Therefore, T is an estimate of the degradation of the channel quality caused by full duplex operation. If T is between T1 and T2, this indicates acceptable interference at UE2. If so, the serving point then informs UE1 to reduce MCS level (Step 518).

T1 and T2 may be preset (for example T1=2 dB and T2=0 dB) or may be dynamically assigned by the base station depending upon the present level of the CQIs from UE2 304 or known priorities and quality of service requirements of the UEs. If T is not between T1 and T2, then it is determined if T>T1 in step 520. If this is true, it indicates that there is excessive interference at UE2 304. If so, then the BS (serving point 306) informs UE1 302 to reduce the transmit power (Tx) by T−T1 and to reduce the MCS level in step 522. Then the UE2 CQI_FD report is mathematically adjusted by T−T1 in step 524 to reflect the change in power. Then UE2 reports for CQI_FD and CQI_Normal are then sent to the link adaptation process for UE2 which is being served in the downlink direction DL 314 (FIG. 5(d)) in step 526.

If T is not between T1 and T2 and is not greater than T1. This indicates that there is no or negligible interference at UE2. If so, the UE2 reports for CQI_FD and CQI_Normal are sent to the link adaptation process for UE2 304 (FIG. 5(d)) at step 528 and in step 530, it is determined if UE1 302 is transmitting at maximum power. If yes, then the BS informs UE1 302 to reduce MCS in step 532. If UE1 302 is transmitting at maximum power, the BS informs UE1 302 to increase transmission power by T1 in step 534.

If the SINR of UL 312 was determined to be increasing at step 508 of FIG. 5(a) the process moves to the steps shown in FIG. 5(c). In step 536, the serving point requests a non-periodic CQI report. In step 538, based on the SINR of UL 312 and the CQI reports, it is determined if full duplex is still the best mode for communication between the serving point 306, UE1 302 and UE2 304. If not, the process goes back to step 502 (FIG. 5(a)) to reassign channels. If it is appropriate to continue in full duplex mode, it is determined if T>T1 in step 540. If so, this indicates that there is excessive interference at UE2. The BS informs UE1 to reduce the Tx power by T−T1 and to reduce MCS, if needed, in step 542. Then the UE2 CQI_FD is mathematically adjusted by T−T1 in step 544 and the UE2 CQIs are provided to the UE2 link adaptation (FIG. 5(d)) in step 546.

If the answer to step 540 is no, this indicates that there is acceptable or no interference at UE2. The UE2 CQIs are then provided to the UE2 link adaptation (FIG. 5(d)) in step 548. Then it is determined if UE1 is using maximum MCS in step 550o. If not, the BS informs UE1 to increase the MCS level in step 552. If so, the BS informs UE1 to reduce transmission power in step 554.

Figure 5D:
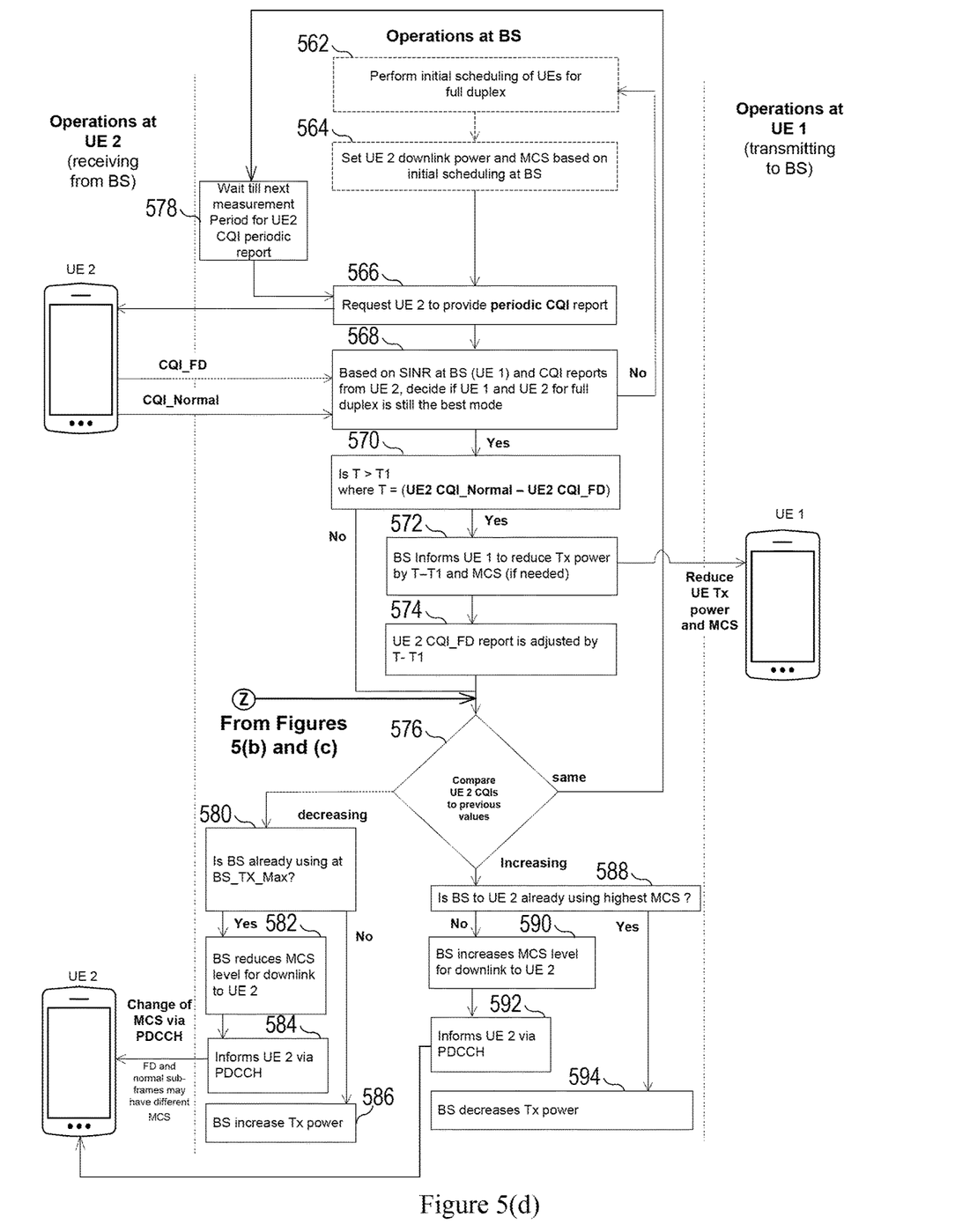

FIG. 5(d) illustrates the process steps for link adaptation for the UE for downlink 314 (UE 2). As with FIG. 5(a), step 562 includes the initial scheduling of UEs for full duplex operation. In step 564, the UE2 304 downlink power and MCS are set based on the initial scheduling of step 562. In step 564, UE2 is requested to provide a periodic CQI report for both CQI_FD and CQI_Normal time periods.

In step 568, based on the CQI reports from UE2 304 and the SINR at the serving point 306, it is determined if full duplex operation is the best mode. If not, the process returns to step 562 and the whole process is reinitiated. If so, it is determined if T>T1 where T=CQI_Normal−CQI_FD in step 570. If so, in step 572, the BS informs UE1 to reduce Tx power by T−T1 and reduce MCS, if needed. Then CQI_FD is mathematically reduced by T−T1 in step 574.

In step 576, it is determined if CQI_Normal and CQI_FD are increasing, decreasing or the same as prior measurements. If they are the same, the process loops back to step 578 to wait for the next periodic report. If either of the CQIs are decreasing, it is determined in step 580 if the BS (serving point 306) is using maximum Tx power (BS_Tx_Max). If yes, then BS reduces the MCS level for the DL UE (UE 2) 314 in step 582. In step 584, UE2 304 is notified of the change in MCS, for example via the physical downlink control channel (PDCCH). If the BS is not using max power, BS Tx power is increased in step 586. Further explanation of BS_TX_Max is provided below with regard to FIGS. 6(a) and 6(b).

If it is determined in step 576 that either of the CQIs are increasing, it is determined in step 588 if the DL 314 is using the highest MCS. If not, the BS increases the MCS level in step 590. In step 592, UE2 304 is notified of the change in MCS using, for example, the PDCCH. If it is determined in step 588 that the highest MCS is already being used, BS Tx power is decreased in step 594. However, in some systems, user specific DL power control may not be available.

In FIG. 5(d), the process describes basing decisions on whether either or both CQI_FD or CQI_Normal are increasing, decreasing or remaining the same. However, in another embodiment, the process from step 576 onwards may be implemented for each CQI measurement (CQI_FD and CQI_normal) separately.

In some systems, (i.e. LTE system), there is no user specific downlink power control and the overall transmission power from the serving point per user that is set in a semi-static way by the number of single carriers (SCs) allocated to each user. For such systems, link adaptation for the receiving users (i.e. UE2 304) can only use changes to MCS for adaptation. For systems that operate downlink power control in this way, the overall transmission power from the base stations (and if power has reached (BS_Tx_Max)) is ultimately set by how many users are allocated in the frequency domain. However, for other systems (i.e. future WLAN standards) or future 5G systems (5G NOMA or mmWave), per user power control might be used in the downlink and particular users may not be using frequency division/multiple access (FDMA) multiplexed links (i.e. 802.11ad or NSN 5G proposal for 5G mmWave), therefore user specific downlink power control is included as one option in the process of FIG. 5 (d). However since some systems may operate without the user specific downlink power control, the steps 586 and 594 can also optionally be removed.

The process of FIGS. 5(a) through (d) provides a link adaption scheme for multi-user full duplex links where the different link directions can be separately adapted. To achieve this, the effects of UE to UE and base station self-interference need to be closely monitored and controlled.

Since the processes of FIGS. 5(a)-(d) compare the difference between the reported CQI_Normal and CQI_FD from the receiving UE 2 against the upper and lower thresholds T1 and T2, the amount of interference that the receiving UE2 experiences can be dynamically set by the serving BS. This is particularly useful when the serving BS has knowledge of the priorities (or required quality of service (QoS)) of the different links. For instance if UE 1 302 (uplink 312) is an emergency user (highest priority), the upper and lower level thresholds T1 and T2 could be set to high values, so that the downlink 314 user (UE 2 304) (which could be a normal priority user) could be temporarily subjected to more interference than in a normal situation, to give priority to maximize the link capacity of the emergency uplink user. Alternatively, if the downlink 314 user (UE 2 304) is an emergency user (highest priority), the upper and lower thresholds T1 and T2 could be set to low values, so that UE 2 304 it is fully protected from any possible interference from uplink user UE 1 302. The priorities of the users (or required QoS) may be directly signaled to the serving BS or may be obtained via higher level signaling.

Figure 6A:
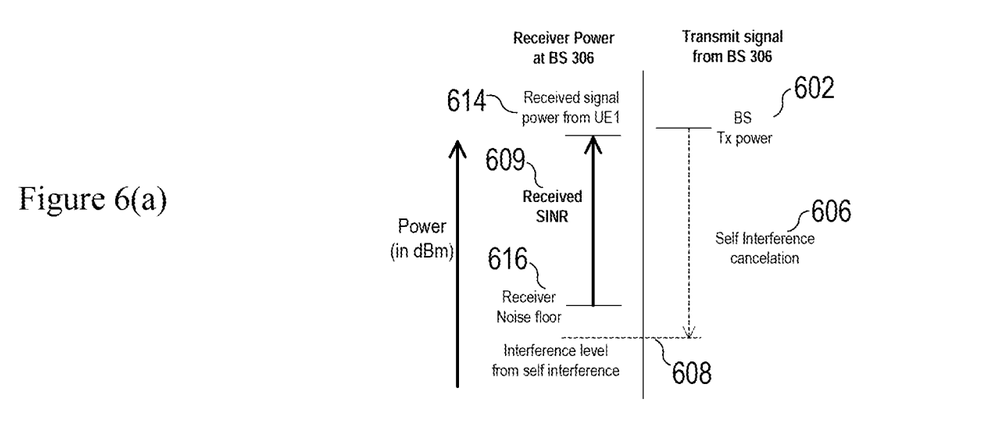
FIGS. 6(a) and 6(b) are diagrams illustrating the effect of interference on the UL from the DL in a multi-user full duplex mode for different levels of transmission power and attenuation.
Figure 6B:
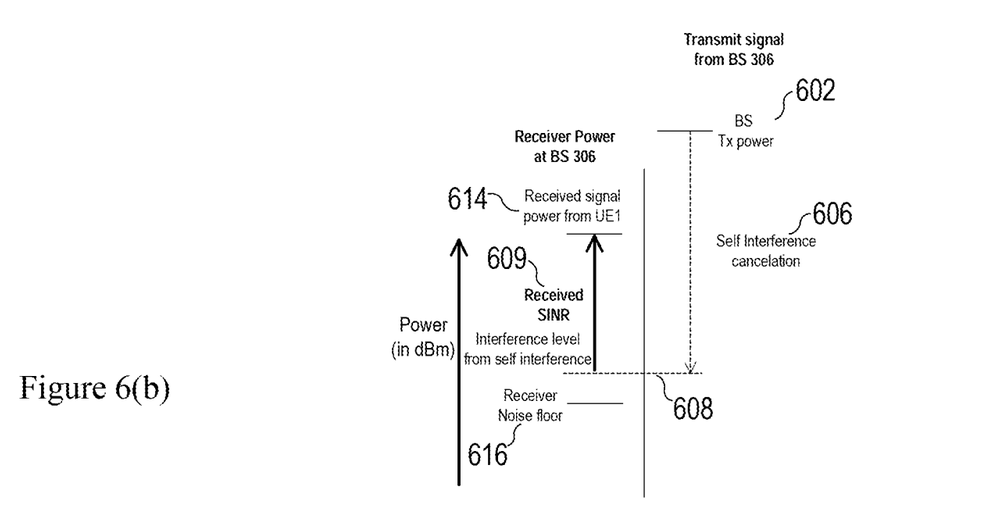

FIGS. 6(a) and 6(b) are diagrams illustrating the effect of interference on UL from DL in a multi-user full duplex mode (at the serving point (or base station) 306 in FIG. 3) for different levels of transmission power and attenuation. With regard to the interference level of the base station (BS) transmit power 602 with the received UL signal 312 via self-interference 310 (FIG. 3), BS transmit power 602 is attenuated by is a self-interference cancellation methods 606 to provide self-interference level 608. In FIG. 6(a), self-interference level 608 is below the receiver noise floor 616 of the base station. Therefore, in the scenario of FIG. 6(a), self-interference 310 has no effect on the SINR 609 of UL 312 (i.e. the difference between the received signal power 614 and the receiver noise floor 616).

In FIG. 6(b), the BS Tx power 602 has been raised to a level such that self-interference level 608 is greater than the receiver noise floor 616. Therefore, the self-interference level 608 impacts the SINR 609. This could be compensated for by raising the power of UL 312 (from UE 1), and thus raising the received signal power 614. However, this also increases UE1 to UE2 interference 308 (FIG. 3), which may cause BS 306 to increase power on DL 314, which increases the BS Tx power, which causes the cycle to repeat in a runaway manner, as discussed above. To avoid this runaway effect, maximum BS Tx power 602 as used in step 580 (FIG. 5(d)) is set to a fixed value (BS Tx_Max). This value can either set to a value equal to the receiver noise floor 616 plus the self-interference cancellation 606 to ensure that the BS transmission power never influences the received SINR. Or it could alternatively be dynamically set by the BS based on the SINR margin of received UL signal.

Figure 7A:
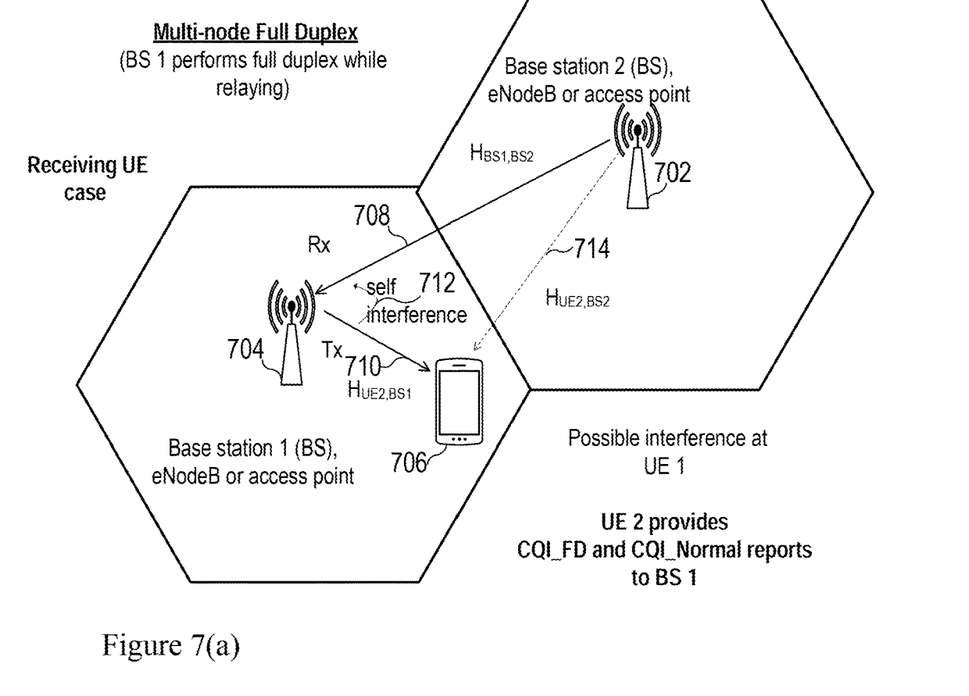
FIGS. 7(a) and 7(b) illustrate an embodiment link adaptation process applied to a full duplex relaying system.
Figure 7B:
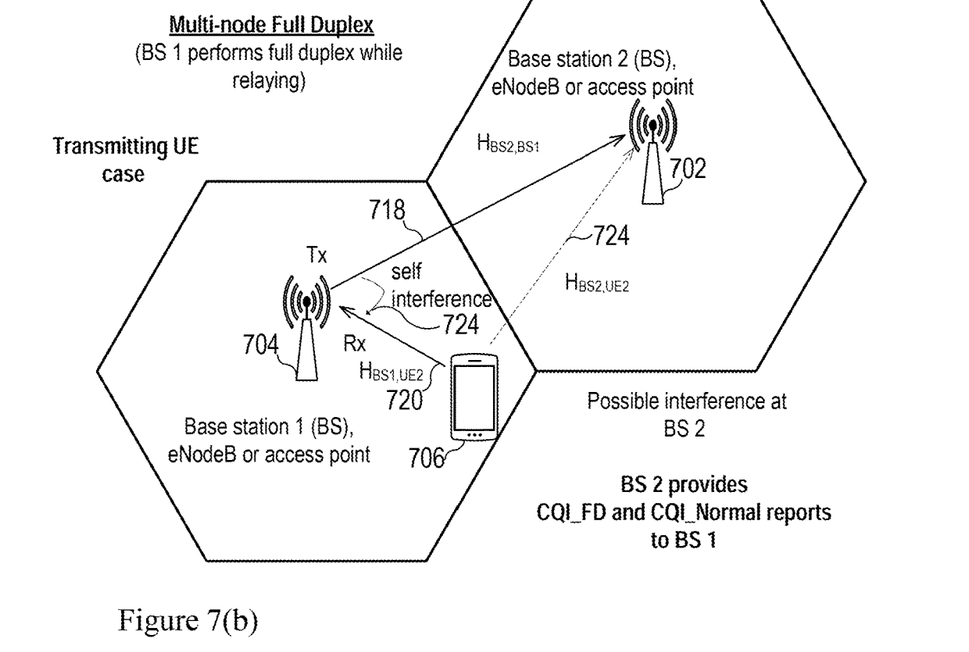

FIGS. 7(a) and 7(b) illustrate an embodiment link adaptation process applied to a full duplex relaying system. FIGS. 5(a) through (d) address the case when multiple users are supported in one coverage area. However the general concept can also be applied when an in-band full duplex relay is used across cell sites or transmission points. In FIGS. 7(a) and 7(b), serving point 704 is relaying a signal from serving point 702 to UE 706. Serving point 704 is working in full duplex mode and is receiving an UL transmission 708 from serving point 702 and at the same time and frequency is serving a DL transmission 710 to UE 706. In this scenario, self-interference 712 from the DL transmission 710 may interfere with reception of the signal from UL transmission 708 and interference 714 from UL transmission 708 may interfere with the reception of DL 710 at UE 706.

In FIG. 7(b), UE 706 has an UL 720 to serving point 704. Serving point 704 then relays the signal to BS 702 on DL 718. In this circumstance, self-interference 724 interferes with the reception of UL 720 at serving point 704 and interference 724 from UL 720 may interfere with the reception of DL 718 at serving point 702. The only significant difference between these relay cases and the multi-user case described with regard to FIGS. 5(a) through (d) is that is the relay link (serving point to serving point link) may or may not require link adaptation because the relay link may be implemented with a fixed MCS level. However, even if link adaptation is not implemented in the relay link, it is assumed that the serving point 704 provides CQI reports for normal and full duplex sub-frames (CQI_NORMAL and CQI_FD) so that any interference can be measured and that the neighboring cells are synchronized.

To implement the link adaptation for the situation of FIG. 7(a), the flow chart in FIGS. 5(a)-5(d) are modified by changing all references to the transmitting UE1 302 to serving point 702. For link adaptation for the situation of FIG. 7(b), the flow chart on FIGS. 5(a)-5(d) are modified by changing all references to the receiving UE2 304 to the receiving serving point 702 on the flowcharts.

Figure 8:
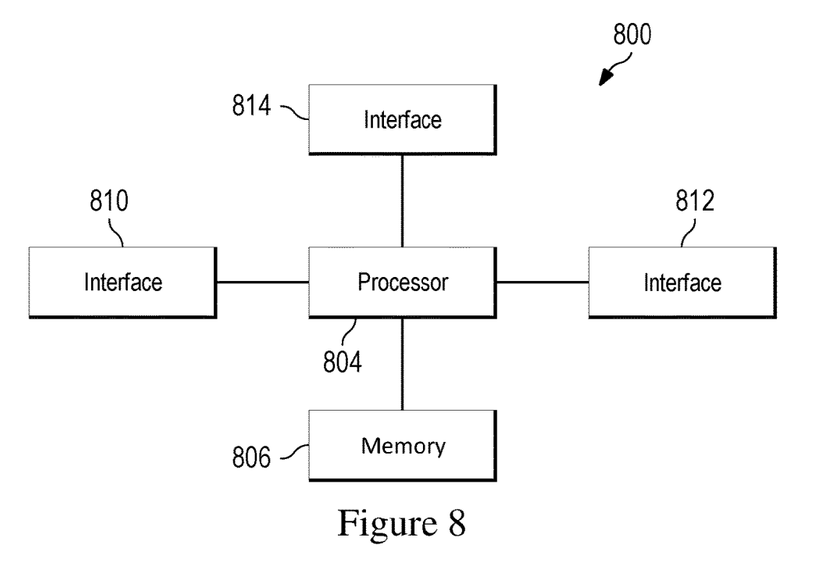
FIG. 8 illustrates a block diagram of an embodiment processing system for performing methods described herein.

FIG. 8 illustrates a block diagram of an embodiment processing system 800 for performing methods described herein, which may be installed in a host device, such as a serving point. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or UE (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network such as base station 406 (FIG. 4). In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network such as UE1 402 (FIG. 4).

Figure 9:
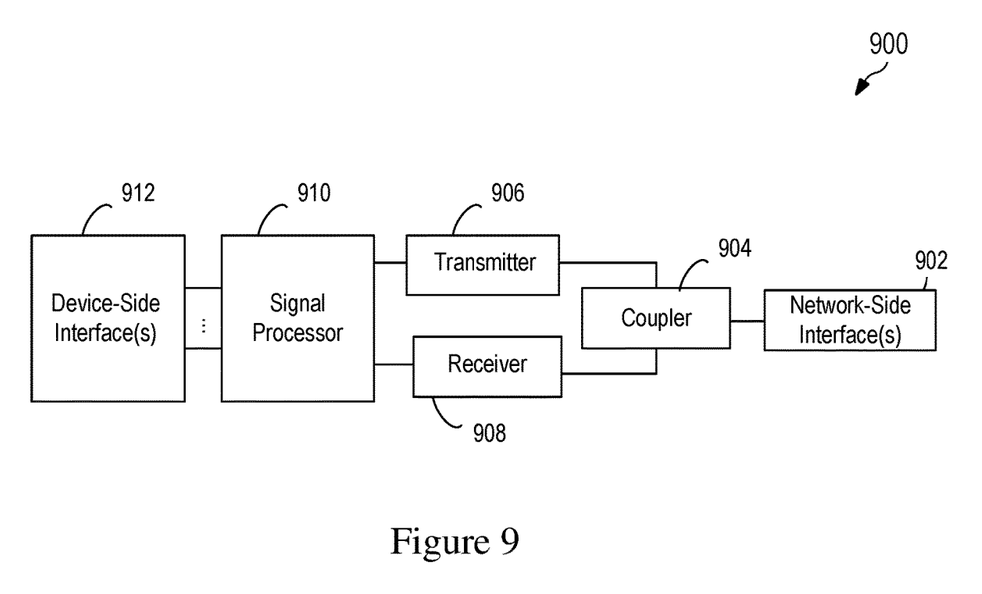
FIG. 9 illustrates a block diagram of a transceiver adapted to transmit and receive signaling over a telecommunications network.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
providing, by a user device, a multi-user full duplex mode enabling a first link direction from a first wireless device to the user device, and a second link direction from the user device to a second wireless device;
requesting, by the user device from the second wireless device, a first channel quality indicator indicating channel quality between the user device and the second wireless device in a full duplex time period and a second channel quality indicator indicating channel quality between the user device and the second wireless device in a non-full duplex time period; and
providing, by the user device, a signal to at least one of the first or second wireless devices to adjust at least one parameter of the full duplex mode based on an evaluation of the full duplex mode using the first and second channel quality indicators.

2. The method of claim 1 wherein the at least one parameter is a parameter of the first link direction.

3. The method of claim 1 wherein the at least one parameter is a parameter of the second link direction, and wherein at least one of the full duplex time period or the non-full duplex time period includes single subframes, multiple subframes, single time slots or multiple time slots within a transmission frame.

4. The method of claim 1 further comprising adjusting at least one of a power or a modulation and coding scheme (MCS) of the first link direction or the second link direction.

5. The method of claim 1 wherein the evaluation includes comparing a difference between the second and first channel quality indicators to at least a first threshold.

6. The method of claim 5 wherein, in response to the difference between the second and first channel quality indicators being greater than the first threshold, a transmission power of the first link direction is reduced by the difference minus the first threshold.

7. The method of claim 6 wherein the first channel quality indicator is reduced by the difference minus the first threshold.

8. The method of claim 5 wherein the first threshold is set by the user device based on at least one of a value of the first channel quality indicator, the second channel quality indicator, a priority of scheduled devices connected to the user device or quality of service requirements of at least one of the first wireless device or the second wireless device.

9. The method of claim 1 wherein a transmission power of the second link direction is limited such that a self-interference caused by the second link direction at the user device is below a third threshold.

10. The method of claim 1 wherein the first wireless device is a second user device or a serving point.

11. A method comprising:
providing, by a user device, a multi-user full duplex mode enabling a first link direction from a first wireless device to the user device, and a second link direction from the user device to a second wireless device;
requesting by the user device from the second wireless device a first channel quality index (CQI) indicating channel quality between the user device and the second wireless device in a full duplex time period and a second CQI indicating channel quality between the user device and the second wireless device in a non-full duplex time period;
in response to a first received signal to interference plus noise ratio (SINR) from the first link direction being higher than a stored SINR and a difference between the second CQI and the first CQI being greater than a first threshold, reducing a transmission power of the first wireless device;
in response to the first received SINR being higher than the stored SINR and the difference between the second CQI and the first CQI being lower than the first threshold, increasing a modulation and coding scheme (MCS) of the first wireless device or reducing the transmission power of the first wireless device;
in response to the first received SINR being the same as the stored SINR, waiting until a subsequent SINR measurement;
in response to the first received SINR being lower than the stored SINR and the difference between the second CQI and the first CQI being greater than the first threshold, reducing a first link direction transmission power of the first wireless device and reducing the MCS of the first wireless device;
in response to the first received SINR being lower than the stored SINR and the difference between the second CQI and the first CQI being lower than the first threshold but greater than a second threshold, reducing the MCS of the first wireless device; or
in response to the first received SINR being lower than the stored SINR and the difference between the second CQI and the first CQI being lower than the second threshold, increasing the transmission power of the first wireless device or reducing the MCS of the first wireless device.

12. The method of claim 11 wherein if the first SINR is lower than the stored SINR and if the difference between the second CQI and the first CQI is lower than the second threshold, determining if the transmission power of the first wireless device is at a maximum, and:
increasing the transmission power of the first wireless device if the transmission power is not at the maximum, or
reducing the MCS of the first wireless device if the transmission power is at the maximum.

13. A user device comprising:
a non-transitory memory storage comprising instructions; and
one or more processors in communication with the non-transitory memory storage, wherein the one or more processors execute the instructions to:
provide a multi-user full duplex mode enabling a first link direction from a first wireless device to the user device, and a second link direction from the user device to a second wireless device;
request from the second wireless device a first channel quality indicator indicating channel quality between the user device and the second wireless device in a full duplex time period and a second channel quality indicator indicating channel quality between the user device and the second wireless device in a non-full duplex time period; and
adjust at least one parameter of the full duplex mode based on an evaluation of the full duplex mode using the first and second channel quality indicators.

14. The user device of claim 13 wherein the one or more processors execute the instructions to request the first and second channel quality indicators non-periodically.

15. The user device of claim 13 wherein the one or more processors execute the instructions to determine, based on the first and second channel quality indicators and a signal to noise ratio, whether to continue full duplex operation or to reschedule the first and second wireless devices.

16. The user device of claim 13 wherein the one or more processors executing the instructions to adjust the at least one parameter comprises the one or more processors executing the instructions to adjust at least one of a power or a modulation and coding scheme of the first link direction or the second link direction.

17. The user device of claim 13 wherein, in response to a difference between the first and second channel quality indicators being greater than a threshold, the one or more processors execute the instructions to reduce a transmission power of the first link direction by the difference.

18. The user device of claim 17 wherein the one or more processors execute the instructions to set the threshold based on at least one of a value of the second channel quality indicator, a priority of scheduled devices connected to the user device or quality of service requirements of at least one of the first or second wireless devices.

19. The user device of claim 13 wherein a transmission power of the second link direction is limited such that a self-interference cause by the second link direction is below a threshold.

20. The user device of claim 13 wherein the first wireless device is a serving point or a second user device.

* * * * *